(12) United States Patent
Ostrover

(10) Patent No.: US 7,330,638 B2
(45) Date of Patent: *Feb. 12, 2008

(54) APPARATUS GENERATING CONTENT CODES FOR AUDIOVISUAL PROGRAMS

(75) Inventor: Lewis S. Ostrover, Los Angeles, CA (US)

(73) Assignee: Warner Bros. Home Entertainment Inc., Burbank, CA (US)

( * ) Notice: Subject to any disclaimer, the term of this patent is extended or adjusted under 35 U.S.C. 154(b) by 1209 days.

This patent is subject to a terminal disclaimer.

(21) Appl. No.: 09/921,044

(22) Filed: Aug. 2, 2001

(65) Prior Publication Data

US 2003/0026587 A1 Feb. 6, 2003

(51) Int. Cl.
*H04N 5/91* (2006.01)

(52) U.S. Cl. ............................... 386/52; 386/95
(58) Field of Classification Search ............. 386/46, 386/52, 55, 65, 95, 111; 715/723; 352/5

See application file for complete search history.

(56) References Cited

U.S. PATENT DOCUMENTS

| | | | |
|---|---|---|---|
| 3,947,669 A | 3/1976 | Simmons et al. | |
| 4,368,961 A | 1/1983 | Mattes | |
| 4,489,316 A | 12/1984 | MacQuivey | |
| 4,501,478 A * | 2/1985 | Mattes | 352/5 |
| 4,774,600 A | 9/1988 | Baumeister | |
| 4,931,879 A * | 6/1990 | Koga et al. | 386/111 |
| 5,122,886 A | 6/1992 | Tanaka | |
| 5,172,111 A | 12/1992 | Olivo et al. | |
| 5,459,517 A * | 10/1995 | Kunitake et al. | 375/240.13 |
| 5,589,945 A | 12/1996 | Abecassis | |
| 5,661,844 A | 8/1997 | Park | |
| 5,734,444 A | 3/1998 | Yoshinobu | |
| 5,758,026 A | 5/1998 | Lobley et al. | |
| 5,760,767 A * | 6/1998 | Shore et al. | 715/723 |
| 5,892,536 A | 4/1999 | Logan et al. | |
| 5,913,013 A | 6/1999 | Abecassis et al. | |
| 5,950,172 A | 9/1999 | Klingman | |
| 5,986,692 A | 11/1999 | Logan et al. | |
| 5,987,211 A | 11/1999 | Abecassis | |
| 6,038,367 A | 3/2000 | Abecassis | |
| 6,091,886 A | 7/2000 | Abecassis | |
| 6,208,805 B1 | 3/2001 | Abecassis | |
| 6,236,801 B1 * | 5/2001 | Engle et al. | 386/52 |
| 6,351,596 B1 | 2/2002 | Ostrover | |
| 6,411,771 B1 * | 6/2002 | Aotake | 386/52 |
| 6,704,029 B1 | 3/2004 | Ikeda et al. | |

(Continued)

FOREIGN PATENT DOCUMENTS

JP 08-018923 1/1996

(Continued)

*Primary Examiner*—Huy Nguyen
(74) *Attorney, Agent, or Firm*—Gottlieb, Rackman & Reisman, P.C.

(57) ABSTRACT

An apparatus for generating content codes for the scenes of a program includes a scene detector that detects the start of new scene, and a selector that allows a viewer to enter one or more content codes for the scene. The content code(s) and data identifying the scene are then stored for later use. The apparatus also includes a new-scene indicator that is activated when a new scene begins and is then deactivated after content code(s) have been inputted for the scene.

15 Claims, 2 Drawing Sheets

U.S. PATENT DOCUMENTS

2004/0128681 A1 7/2004 Hancock et al.
2005/0028191 A1 2/2005 Sullivan et al.

FOREIGN PATENT DOCUMENTS

| | | |
|---|---|---|
| JP | 11-238071 | 8/1999 |
| JP | 2001-043630 | 2/2001 |
| JP | 2001-197431 | 7/2001 |
| WO | WO 00/ 04726 | 1/2000 |
| WO | WO 00/04726 A2 | 1/2000 |

* cited by examiner

APPARATUS GENERATING CONTENT CODES FOR AUDIOVISUAL PROGRAMS

RELATED APPLICATIONS

The subject matter of this application is related to a commonly owned application Ser. No. 09/921,420, filed Aug. 2, 2001, and entitled "APPARATUS FOR GENERATING CONTENT CODES FOR AUDIOVISUAL PROGRAMS BY MULTIPLE VIEWERS".

BACKGROUND OF THE INVENTION

A. Field of Invention

This invention relates to the tagging of audiovisual content of a program, such as analog or digital motion pictures that are transmitted over cable, or video transmitted over the Internet. More particularly, it pertains to a viewer-operated apparatus for tagging individual scenes of the audiovisual program so that it can later be replayed with selected scenes being omitted or replaced by others.

B. Description of the Prior Art

Presently, many video programs have ratings that can be used by viewers to determine whether they would like to play the programs, or whether they would allow others (such as children or adolescents) to play them. These types of ratings are also becoming available for TV shows, games, and other audiovisual programs. Programs broadcast over the Internet may be filtered or otherwise restricted using on-line filtering services, and set-top boxes and TVs with V-CHIP content filtering technology also exist for this purpose.

As an improvement to current technology, it has been suggested that rating codes be provided for individual segments, or scenes, of programs.

Automated playing devices would then be able to seamlessly eliminate segments with selected content, and/or substitute other segments with acceptable content if such segments are available. Commonly assigned co-pending application Ser. No. 09/479,819 filed Jan. 7, 2000, entitled "Content Control of Broadcast Programs" and incorporated herein by reference, discloses a personal video recorder that receives and stores a broadcast program with each scene being tagged with a content rating. Parameters for acceptability of content are designated by viewers, and the appropriate scenes are played as a seamless continuous program. U.S. Pat. Nos. 5,987,211 and 6,208,805 to Abecassis discloses an apparatus which records a program on a disk and filters content according to viewer preferences. A viewer is shown only the segments having acceptable content. A parent has the ability to review a program and tag unacceptable scenes. The apparatus then omits the unacceptable scenes when the program is played.

A major disadvantage of all of these systems is that, whether a universal rating is assigned to a whole program, or ratings are assigned to each of a program's individual scenes, the ratings still reflect a limited number of categories accepted by the public at large, industry-wide guidelines or the opinions of an editor. Thus, they fail to reflect inherent differences in the filtering categories of individual viewers due to many factors such as geographic location, level of education, income, religious and moral beliefs, etc., factors that meaningfully affect a person's views and preferences for what kind of programs and content they, or their children, should view.

OBJECTIVES AND SUMMARY OF THE INVENTION

It is believed to be beneficial to allow viewers to tag program scenes in keeping with their own preferences. Many programs, e.g. many TV shows and unrated movies, lack any form of scene tagging, and in other instances adults may desire to personally oversee audiovisual programs viewed by their children.

Accordingly, it is an objective of the present invention to provide an apparatus that permits viewing of scenes of a program, and the tagging of each scene with a content code that can be used later for filtering purposes.

A further objective is to provide an apparatus that is viewer-friendly and easy to operate, an apparatus capable of being operated at home by an ordinary consumer.

Yet another objective is to provide an apparatus that can provide types of content tags other than conventional ratings.

Yet another objective is to provide an apparatus that can be easily adapted to accept content tags for each scene.

A further objective is to provide an apparatus in which a program's scenes can be designated by the program provider, automatically detected, or designated by a viewer.

Briefly, a viewer displays a program on an audiovisual monitoring system. The apparatus for assigning content codes to the program's scenes constructed in accordance with this invention includes a scene detector identifying the individual scenes of a program. The scene detector, in one embodiment, detects scene changes by analyzing the characteristics of sequential frames using known techniques. In another embodiment, the program itself includes codes that identify its scenes. In a third embodiment, the scene detector responds to a scene selector that is viewer activated.

Also included in this invention is a scene indicator, which may be in the form of a visual or audible signal, and which indicates the beginning of a new scene. The viewer is prompted by the scene indicator to enter a content code for the new scene, this content code being related to the audio and visual content of the scene. In one embodiment, once the content code is entered, the scene indicator is deactivated until the detection of the next scene. If the duration of the scene is known, a timer may be provided to indicate to the viewer the time left to the end of the scene. If no content code is entered by the viewer by the end of the scene, a default content code is automatically assigned for that scene. The default may be the code for the immediately preceding scene. In another embodiment, the scene indicator is activated only for a brief duration (e.g., 5-10 seconds) to indicate the beginning of each scene (and, implicitly, the end of the previous scene).

A code selector is also included in the apparatus. This code selector is adapted to receive the content code for a scene and to enter into a file a two-component code (two record fields) for the scene: an identification of the scene and the content code for the scene. The identification may be generated by a timer that times the duration of each scene as well as previous scenes and then generates a starting and ending time for the scene. The apparatus also includes a memory for storing the codes for all the scenes including the assigned content codes and scene identifications.

The apparatus further includes a controller adapted to selectively activate the scene indicator and generally manage the generation and storage of the scene codes.

In this manner, the apparatus described above provides a user with the ability to designate and assign content codes for the scenes of a program in accordance with his individual tastes or preferences.

DETAILED DESCRIPTION OF THE INVENTION

Figure 1:
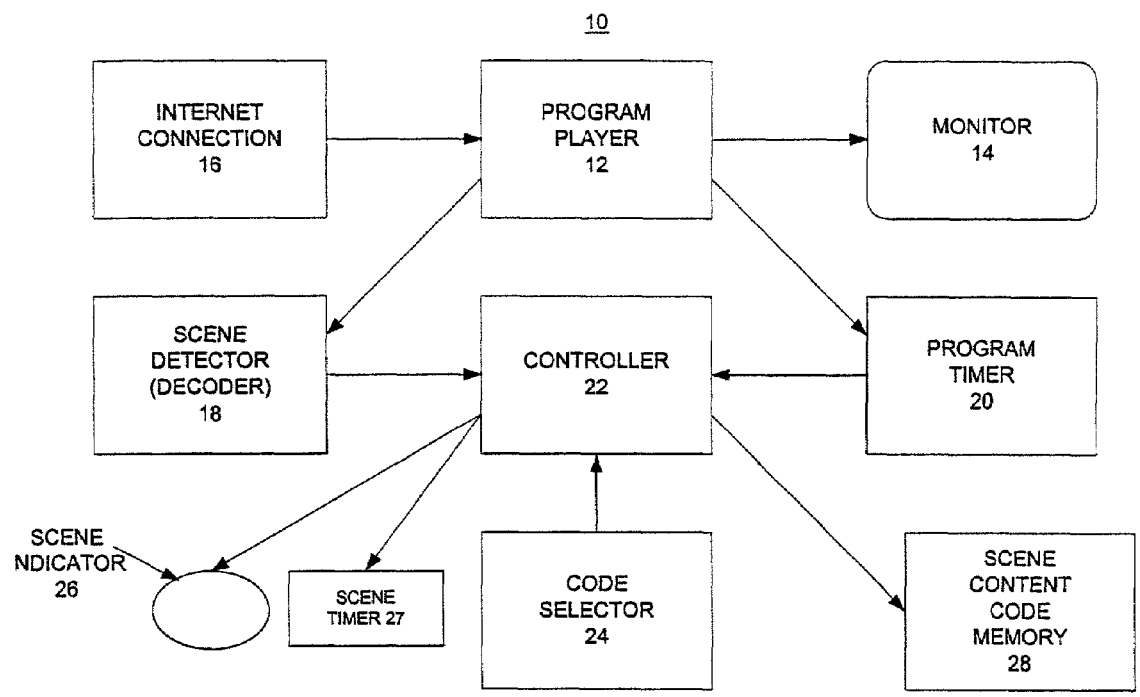
FIG. 1 shows a block diagram of an apparatus for assigning content codes to scenes in accordance with this invention.

Referring to FIG. 1, an apparatus 10 constructed in accordance with the invention includes a device such as a program player 12 that is adapted to play an audiovisual program on an audiovisual monitoring system 14. The program could be recorded on a DVD disk, a VCR tape or other similar media, or in a personal video recorder receiving the program from a program source 16, e.g. through a cable, XDSL, or satellite connection.

Associated with the player 12 are a scene detector 18 and a program timer 20. The scene detector 18 is used to detect scenes in the program signal generated by player 12. The program timer 20 generates a count that can be used to provide unique identifications for the scenes of the program. Instead of the timer, other scene identification means may be used, such as a frame counter.

A controller 22 directs the operation of the apparatus 10. The controller 22 is coupled to the scene detector 18 and timer 20, and it is also associated with a code selector 24, a scene indicator 26, a scene timer 27, and a memory 28. It should be understood that all the elements in FIG. 1 can be implemented as a microprocessor-based device such as a PC, or can be incorporated into the program player 12 (especially if the player is a personal video recorder). However the apparatus 10 is shown in FIG. 1 as having discrete components for the sake of clarity.

Figure 2:
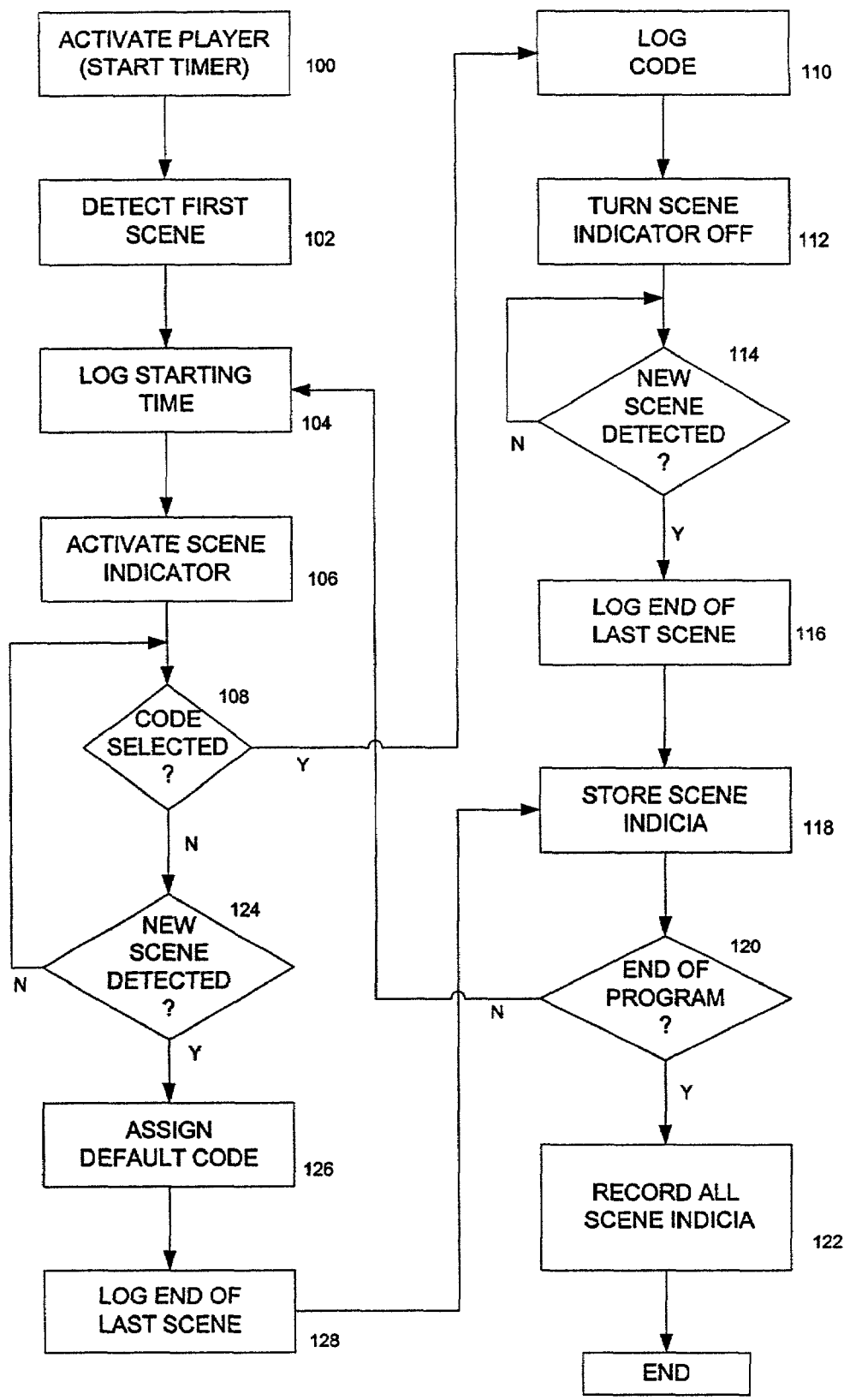
FIG. 2 shows a flow chart for the apparatus of FIG. 1.

The apparatus of FIG. 1 operates as indicated by the flow chart of FIG. 2. In step 100 the program player is activated to start playing a program on audiovisual monitoring system 14. The program timer 20 is activated as well.

As the program is shown, the frames forming the program are monitored by scene detector 18 to detect the start of scenes that comprise the program. Scene detectors of this kind are well known in the art. When the first scene is detected (step 102), the controller 22 logs its starting time as indicated by program timer 20 (step 104).

Figure 3:
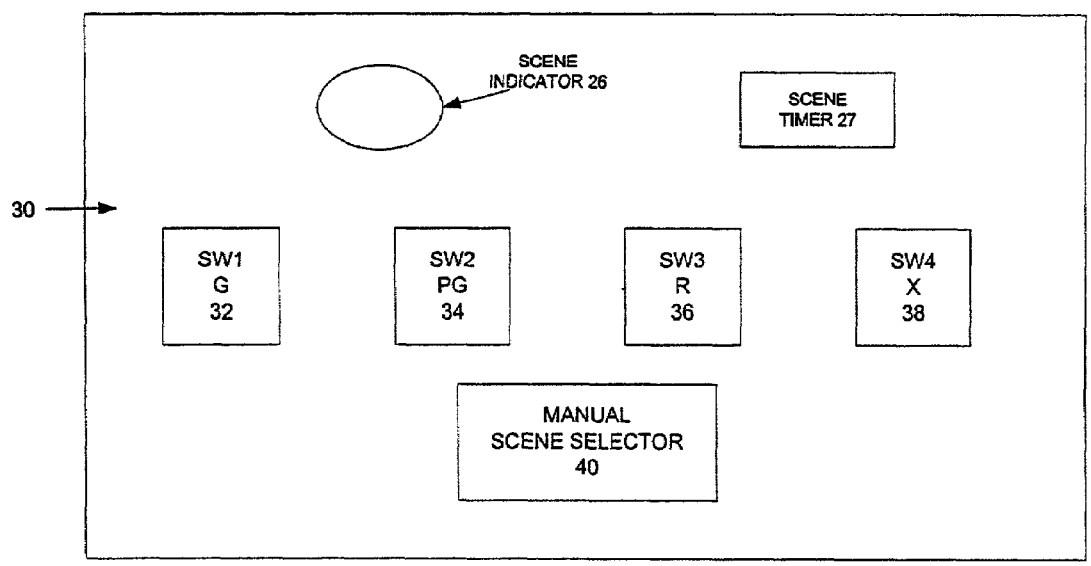
FIG. 3 shows a somewhat diagrammatic view of a selector panel on which a viewer can enter his preferences.

Next, the scene indicator 26 is activated (step 106). The scene indicator 26 may be a simple light that is turned on or a beeper that is activated. The scene indicator 26 is activated to prompt the viewer for a content code, using the code selector 24. The code selector 24, shown in more detail in FIG. 3, consists of a housing 30 which supports a plurality of switches 32, 34, 36 and 38. Each of the switches may be labeled with a content code, for example G, PG, R or X. (More precise content codes may be used, giving rise to more than just four switches). For example, the content codes may indicate that a scene includes profanity, violence, sex, nudity, etc. Alternatively, the content codes may be selected using various other criteria. For example, if the program is a documentary about nature, the content code may be used to designate all scenes showing animals. Each of the switches 32-38 may be a momentary pushbutton switch. The scene indicator 26 may be positioned on the housing 30 as well.

In some instances, the scene detector 18 may be too sensitive for the purposes of the present invention. More particularly, the scene detector may designate every camera angle change as a new scene. Therefore it may be advisable to have a viewer determine the start and end time of each scene. For this purpose, the code selector 24 may include a manual scene selector 40. For example, the manual scene selector 40 may be a momentary pushbutton like switches 32-38. When this manual scene selector 40 is provided, the scene detector 18 can be turned off or omitted.

In such an embodiment, after the program starts a viewer selects the start time of a scene by activating the manual scene selector 40. When the manual scene selector 40 is activated, the scene indicator 26 is also activated, thereby indicating that the current scene has not yet been assigned a content code. The start time is also logged, as in the embodiment of FIG. 2. When the viewer selects a content code, the indicator 26 goes off and stays off until the next scene is identified by the viewer operating button 40. In an alternate embodiment of the invention, the scene indicator 26 is activated only for a brief time, (e.g., three to ten seconds) duration to alert the viewer of the beginning of a scene (and the end of the previous scene). In this embodiment, the scene indicator 26 is deactivated independently of the selection of a content code by the viewer.

As discussed above, as each scene is displayed on audiovisual monitoring system 14 with audio heard through associated speakers (not shown), the scene indicator 26 is activated. As the viewer views and listens to the current scene he makes a determination of what its content code should be. He then designates the content code for the scene by activating the appropriate switch 32-38. (It is possible to activate multiple switches if the system accommodates multiple content codes for a scene.) Returning to FIG. 2, in step 108 the controller 22 checks if the viewer has yet selected a content code. If a content code has been selected, then in step 110 the content code is logged together with a corresponding scene identification, e.g., its starting time code. In step 112 the controller 22 deactivates the scene indicator 26. (If the scene indicator 26 is a beeper, it may emit a different sound than when it was activated in step 106).

In step 114 the controller 22 checks the scene detector 18 for a new scene. When a new scene is detected, the controller 22 logs the end (e.g., another time code) of the last scene (step 116).

Next, in step 118 scene indicia, including the appropriate content code(s) and the corresponding scene identification data, are stored in scene content code memory 28.

In step 120 a test is performed to determine if the end of the program has been reached. If the program end has not been reached, then the start time of the new scene is logged in step 104 and the new scene is processed as discussed above. In step 120 if the program end is detected, then in step 122 all the scene indicia are recorded in a specific file that may be left in memory 28, stored on the medium which itself contains the program, or somewhere else.

Back at step 108, if a content code has not been selected yet for the current scene, then in step 124 the controller 22 checks the scene detector 18 for a new scene. If a new scene is not detected, then the system 22 goes back to step 108. If a new scene is detected in step 124, then in step 126 a default content code is assigned to the scene. For example, the default code may be the code assigned to the previous scene.

In step 128 the end of the scene being processed is logged and the process continues with step 118.

The apparatus 10 can be modified for other types of operation as well. In one embodiment the scenes may be already defined by a specific code embedded within the program itself. In this case, instead of a scene detector, a decoder detects the beginning and end of each scene. This alternative is indicated in FIG. 1 for element 18.

If the beginning and end points of each scene (and therefore its duration) are known, then, at the beginning of each scene, a scene timer 27 may also be activated. This scene timer 27 can be configured to count down and indicate to a viewer how much time is left to the end of the scene (i.e., the time left before the viewer has to select a code).

Instead of using an automatic or even manually operated scene detector, it is possible simply to allow the viewer to enter content codes at any time. Such changes in content codes would in effect signal a new scene. The advantage of identifying the start of a scene, however, is that the entered content codes are retroactive to the start of the scene. On replay, an appropriate player could curtail viewing of an objectionable scene from its start, not just from when the content codes were entered.

By generating a content code for each scene of a program, a table is created which associates each scene with its content code and the address of the next scene. This table may be stored separately or may be attached to the program itself. The table can be used to control the manner in which the program is played. For example, co-pending commonly assigned U.S. application Ser. No. 09/479,819 filed Jan. 7, 2000, entitled CONTENT CONTROL OF BROADCAST PROGRAMS and incorporated herein by reference discloses a method and apparatus wherein a program is broadcast together with its table to a customer with an appropriately configured personal video recorder. The customer selects an acceptable content code. The personal video recorder then can record and play only the scenes that have a predetermined content code, while skipping the scenes with other codes. Since the table with the content codes is received in advance, the personal recorder can determine the scenes that are to be skipped, and the duration of these skipped scenes. The recorder therefore can delay playing the program by the duration of the skipped scenes so that the program can be played without interruption.

Another advantage of providing a program with a table of scene-associated content codes is that it allows a content provider to create a program with several interchangeable scenes, each scene having a unique content code. A customer may then elect to get a program with all the scenes. Alternatively, a customer may elect to a version of the program with all the scenes having a predetermined content code or codes.

Obviously, numerous other modifications can be made to this invention without departing from its scope, as defined in the appended claims.

I claim:

1. An apparatus for allowing a viewer to assign content codes to scenes of a completed audiovisual program comprising:
   - a content selector having a viewer input for generating a content code for a current scene, said content code being descriptive of the content in said scene and being useable by viewers to determine whether the scene should be played or not;
   - a scene indicator indicating when said current scene needs said content code, said scene indicator being deactivated in response to the selection of said content code by said content selector; and
   - a memory for storing content codes associated with respective scenes.

2. The apparatus of claim 1 wherein said memory stores data relating to the beginnings and endings of scenes together with respective content codes.

3. The apparatus of claim 1 wherein said scene indicator is activated when a new scene is started.

4. The apparatus of claim 3 wherein said scene indicator is deactivated after said content code for the scene is selected by said code selector.

5. The apparatus of claim 1 further including a scene detector that detects a scene automatically and activates said scene indicator.

6. The apparatus of claim 1 further including a manually operated switch for activating said scene indicator at the beginning of each scene.

7. The apparatus of claim 1 further including a timer to indicate the time left before the end of the scene.

8. The apparatus of claim 1 further comprising a controller coupled to said content selector and controlling the state of said scene indicator in response to signals from said content selector.

9. An apparatus for generating content codes for a program signal formed of a sequence of scenes, comprising:
   - a scene detector receiving said program signal and being adapted to detect a starting point for each of said scenes in said program signal;
   - a scene indicator coupled to said scene detector and indicating that a current scene requires a content code, said content code being descriptive of the content of the current scene;
   - a selector activated by a user to select said content code for the current scene;
   - a controller receiving an input from said selector indicating that the content code for the current scene has been received from the user, and in response generating a control signal to said scene indicator to change the state of said scene indicator; and
   - a memory that stores a table of said scenes and the corresponding content codes.

10. The apparatus of claim 9 wherein said scene indictor is deactivated when a content code is assigned to the current scene.

11. The apparatus of claim 9 wherein said program signal includes scene identification codes identifying the starting points of the scenes, wherein said scene detector is adapted to detect said scene identification codes.

12. The apparatus of claim 9 further comprising a scene start selector adapted to be activated by the viewer to indicate the starting points of said scenes.

13. The apparatus of claim 9 wherein said controller is adapted to determine if the viewer fails to provide said content code, said controller being adapted to generate in this case a default content code for said current scene.

14. The apparatus of claim 9 further comprising a timer indicating the time left before the end of the current scene.

15. The apparatus of claim 9 wherein said scene indicator is activated for a predetermined time.

\* \* \* \* \*